May 29, 1923.
F. E. IVES
PHOTOMETER
Filed April 11, 1922 2 Sheets-Sheet 1
1,457,076
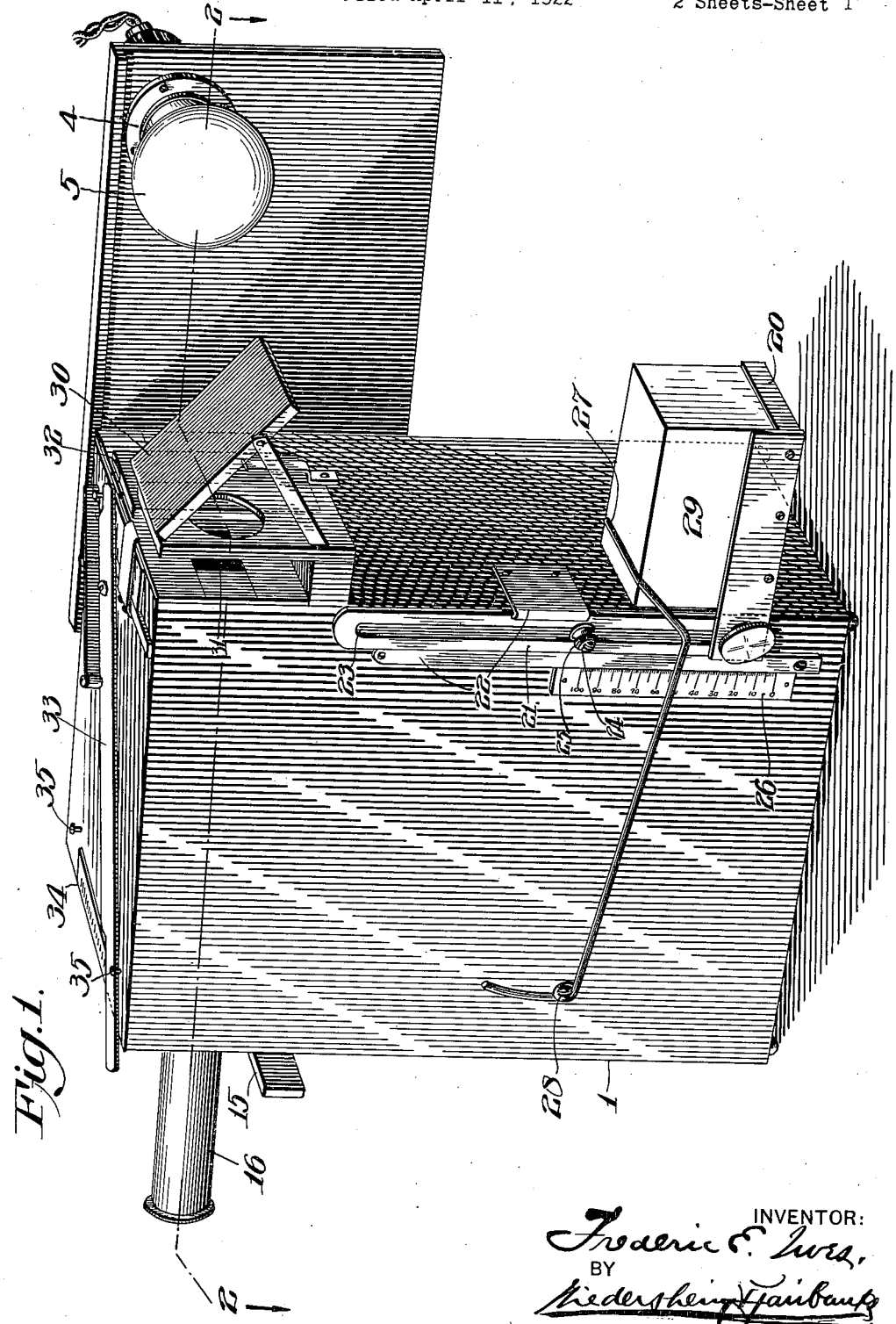

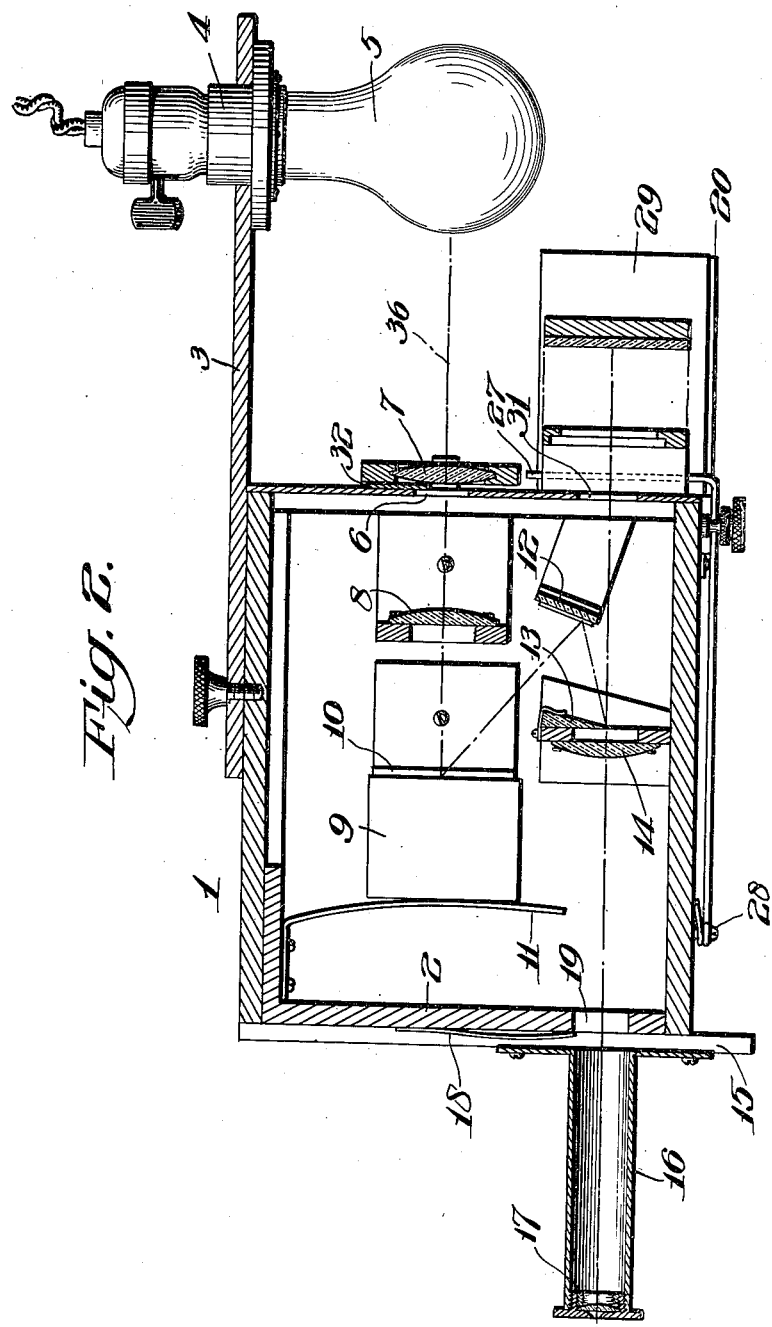

Patented May 29, 1923.

1,457,076

UNITED STATES PATENT OFFICE.

FREDERIC E. IVES, OF PHILADELPHIA, PENNSYLVANIA.

PHOTOMETER.

Application filed April 11, 1922. Serial No. 551,600.

*To all whom it may concern:*

Be it known that I, FREDERIC E. IVES, a citizen of the United States, residing at Philadelphia, county of Philadelphia, State of Pennsylvania, have invented a new and useful Photometer, of which the following is a specification.

The object of my present invention is to devise novel means for measuring the relative luminosity of different sources of light or of either transparent or opaque objects and to provide for such measurements being made if desired through color screens in order that differences of hue as well as of luminosity will be indicated.

In my prior Patent #914,282, granted on March 2, 1909, I have described and broadly claimed a novel construction of a photometer wherein a casing is employed which is provided with two light receiving apertures, with means for varying the area of one of said apertures with a measuring scale cooperating with said means, with a field lens positioned to receive upon one portion the light rays from one of said apertures, with means for directing upon the other portion of the lens the light rays from the other apertures, and with a lens for focusing said field upon the eye, as is clearly specified in claim 6 of my prior patent aforesaid.

In accordance with my present invention, instead of passing the light from the adjustable light measuring aperture directly to its respective half of the field lens, it is first focused upon a white diffusely reflecting surface such as, for example, a block of magnesium carbonate, and this illuminated surface is seen in its respective half field by reflection through a mirror, prism or both, thereby enabling one to employ a very much wider adjustable measuring aperture, with increased luminosity and with greatly reduced liability to error in measurements through lost motion or other mechanical defects in the slit mechanism.

My present invention is also especially adapted for the employment of a source of illumination, both for the measuring slit and the object to be measured, of an artificial light in the form of a white globe mazda lamp which provides a suitable area of even white surface for focusing upon the magnesia block over an area equal to the respective half of the field lens, while the illumination of the object can be controlled by its position with respect to the same light source, or by an adjustable diaphragm under the lamp.

Other novel features of construction and advantage will hereinafter more fully appear in the detailed description and the appended claims.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a perspective view of a photometer, embodying my invention.

Figure 2 represents a sectional plan view of the photometer, the section being taken substantially on line 2—2 of Figure 1.

Similar numerals of reference indicate corresponding parts.

Referring to the drawings, 1 designates the casing of a photometer embodying my invention. 2 designates a drawer or slide which is adapted to carry certain parts of the photometer so that they can be removed as a unit of structure, when desired. The casing 1 has connected to it a plate 3 which carries a lamp socket 4 to receive a white globe mazda lamp 5. The front wall of the casing is apertured as at 6 and in front of this aperture is located a lens 7 which contributes with a lens 8 mounted on the bottom of the drawer 2 to form an image of the lamp globe upon a magnesia block 9 which latter is pressed against an abutment forming plate 10 by means of a spring 11, one end of which is connected to the drawer 2. 12 designates a mirror carried by the bottom of the drawer 2 and 13 is a wedge prism for reflecting and refracting a small area of the illuminated surface of the magnesia block into half of a field lens 14. The back of the drawer 2 has connected with it a bar 15 to which is secured an eye piece 16 having a lens 17. A spring 18 is provided so that the measurements may be made through color screens which are held in position by said spring. The back of the drawer 2 is provided with an aperture 19 registering with the eye piece.

20 designates an adjustable table, which is connected with a slide 21 which co-operates with the guides 22, and this slide 21 is provided with a slot 23 through which passes the screw 24 which carries a nut 25 in order that the slide 21, and thereby the table, can be secured in adjusted position.

26 designates a scale with which co-operates a floating rider 27 in the form of a wire fulcrumed to the casing at 28 and having one end deflected so as to rest upon the top of the magnesia block 29 carried by the table 20. In this manner, I provide means for recording the level of the surface of the magnesia block 29 or of the object to be measured. The front wall of the casing carries an inclined mirror 30 from which the light passes through the aperture 31 in the front wall of the casing, so that the object carried by the adjustable table 20 is seen in the field of the instrument by reflection through the inclined mirror 30. The aperture 6 is provided with an adjustable shutter 32 to which is operatively connected a lever 33 pivotally carried by the casing and having one end adapted to travel over a measuring scale 34. Stops 35 are preferably provided for the lever 33. The path of axial light rays is shown by the dotted line 36 in Figure 2.

In order to adjust the instrument for use, a clean magnesia block 29 is placed upon the adjustable table 20. The measuring slit is then opened to its widest extent, indicating one hundred percent on the measuring scale 34. The table 20 is raised or lowered until the two halves of the field as seen through the eye piece are equally illuminated.

The instrument, as shown in the drawings, is intended to be used in a dark room in order that only light from the mazda lamp will illuminate the object, but when it is desired to use the photometer in a lighted room, a suitable enclosure can be provided.

If, now, a sheet of paper is laid upon the surface of the magnesia block 29, the respective half field will appear of lower luminosity, and its luminosity can be matched and measured by partly closing the measuring slit 6 and taking the reading on the scale 34.

If an object thicker than paper or thin cardboard is to be measured, its upper surface must be brought to the same level as that occupied by the surface of the magnesia block when the preliminary matching of the fields was affected, and adjustment for this purpose is provided by the rider 27, the scale 25 and the adjustable table 20.

The relative luminosity of the colored object can be determined only by measurement through color screens, and a suitable measurement through a suitable variety of color screens will provide a record of both hue and luminosity, the principle involved being the same as in measurements with spectrophotometer, but with the substitution of color screens for spectroscopically isolated spectrum colors.

It will be obvious to experts in optics that while the optical sequence shown must be substantially preserved, some departure from the exact specifications given is permissible. Thus a single lens of suitable focal length at an intermediate position can be substituted for the separate field and eye lenses shown, and a single reflecting prism of suitable form can be substituted for the mirror and wedge prism. Any brilliantly and evenly illuminated surface of sufficient area can be substituted for the white globe mazda lamp. Such departures from the construction specified are in the nature of equivalents, well known in the art.

Having thus described my invention, what I claim as new and desire to secure by Letters Patent is:

1. The combination in a photometer in optical sequence of a source of light having materially extended area of even luminosity, an adjustable diaphragm or shutter with scale, a diffusely reflecting white surface, a reflector and a divided field.

2. The combination in a photometer in optical sequence of a source of light having a materially extended area of even luminosity, an adjustable diaphragm or shutter with scale, a diffusely reflecting white surface, and a reflector whereby a portion of the diffusely reflecting white surface is reflected into a divided aperture in sharp juxtaposition to an area illuminated by light from the object, the relative luminosity of which is to be measured.

3. The combination in a photometer in optical sequence of a source of light having a materially extended area of even luminosity, an adjustable diaphragm or shutter, and an image forming lens, a diffusely reflecting white surface, and a reflector whereby a portion of the diffusely reflecting white surface is reflected into a divided aperture in sharp juxtaposition to an area illuminated by light from the object, the relative luminosity of which is to be measured.

4. The combination in a photometer in optical sequence of a source of light having a materially extended area of even luminosity, an adjustable diaphragm or shutter, with scale and an image forming lens, a diffusely reflecting white surface, and a reflector whereby a portion of the diffusely reflecting white surface is reflected into a divided aperture in sharp juxtaposition to an area illuminated by light from the object, the relative luminosity of which is to be measured.

FREDERIC E. IVES.

Witnesses:
H. S. FAIRBANKS,
C. D. McVAY.